United States Patent
Newsome et al.

(10) Patent No.: US 10,689,799 B2
(45) Date of Patent: Jun. 23, 2020

(54) BALANCED CRIMP SUBSTRATE REINFORCEMENT FOR MOLDED PRODUCTS

(71) Applicant: Highland Industries, Inc., Kernersville, NC (US)

(72) Inventors: James Rollings Newsome, Cheraw, SC (US); Nicholas Adam Cone, Cheraw, SC (US)

(73) Assignee: Highland Industries, Inc., Kernersville, NC (US)

(*) Notice: Subject to any disclaimer, the term of this patent is extended or adjusted under 35 U.S.C. 154(b) by 23 days.

(21) Appl. No.: 15/478,418

(22) Filed: Apr. 4, 2017

(65) Prior Publication Data

US 2018/0282939 A1 Oct. 4, 2018

(51) Int. Cl.
| | |
|---|---|
| *D06M 15/693* | (2006.01) |
| *B29C 70/22* | (2006.01) |
| *B29C 70/42* | (2006.01) |
| *D06M 15/39* | (2006.01) |
| *B60T 17/08* | (2006.01) |

(Continued)

(52) U.S. Cl.
CPC ........... *D06M 15/693* (2013.01); *B29C 70/22* (2013.01); *B29C 70/42* (2013.01); *B60T 17/08* (2013.01); *D06M 15/39* (2013.01); *F16J 3/02* (2013.01); *B29K 2021/00* (2013.01); *B29K 2105/0845* (2013.01); *B29L 2031/16* (2013.01)

(58) Field of Classification Search
None
See application file for complete search history.

(56) References Cited

U.S. PATENT DOCUMENTS

| | | | |
|---|---|---|---|
| 3,435,734 A | | 4/1969 | Bushway et al. |
| 4,624,720 A | * | 11/1986 | Pithouse ............. B29C 61/0633 138/155 |

(Continued)

FOREIGN PATENT DOCUMENTS

| | | |
|---|---|---|
| CN | 205954214 U | 2/2017 |
| WO | WO98/17505 | 4/1998 |
| WO | WO2016/069670 | 5/2016 |

OTHER PUBLICATIONS

Machine translation of CN 205954214 (Year: 2017).*

(Continued)

*Primary Examiner* — Shawn Mckinnon
(74) *Attorney, Agent, or Firm* — Tuggle Duggins, P.A.; Blake P. Hurt

(57) ABSTRACT

A rubber molded product such as a brake cylinder diaphragm with a balanced elongation substrate reinforcement in both the warp and fill directions incorporated therein is provided. The fabric substrate reinforcement is woven without size and overfed after the weaving process leading to balanced crimp and elongation in the length and width directions. The fabric member is also woven with a reduced number of weft threads to start, but which are added back by overfeeding to further render the fabric elongation more isotropic in at least the warp and fill directions. The reinforcement substrate is placed in the mold along with the molding material and formed into the desired shape to assist in shape retention and overall structural stability. A method of forming a molded product including a balanced crimp reinforcement substrate is also provided.

5 Claims, 6 Drawing Sheets

(51) Int. Cl.
*F16J 3/02* (2006.01)
*B29L 31/16* (2006.01)
*B29K 21/00* (2006.01)
*B29K 105/08* (2006.01)

(56) References Cited

U.S. PATENT DOCUMENTS

| | | | | |
|---|---|---|---|---|
| 5,518,814 | A | | 5/1996 | Bonigk |
| 6,044,629 | A | * | 4/2000 | Hirai ................ B29C 45/14336 264/1.7 |
| 7,732,356 | B2 | * | 6/2010 | Schindzielorz ....... B60R 21/235 280/728.1 |
| 8,296,911 | B1 | * | 10/2012 | Pruitt ........................ D06C 3/02 26/51.3 |
| 2002/0189703 | A1 | * | 12/2002 | Medeiros ............... D02G 3/446 139/420 R |
| 2003/0094019 | A1 | | 5/2003 | Miyake et al. |
| 2005/0058805 | A1 | * | 3/2005 | Kimura ................ B29C 70/081 428/113 |
| 2012/0121840 | A1 | * | 5/2012 | Aksay ...................... C08J 5/046 428/36.9 |
| 2012/0207957 | A1 | * | 8/2012 | Michiels ................... B32B 7/12 428/36.1 |

OTHER PUBLICATIONS

One page International Search Report dated May 25, 2018 from PCT/US2018/021457 of Highland Industries, Inc., Assignee of the instant application.

\* cited by examiner

BALANCED CRIMP SUBSTRATE REINFORCEMENT FOR MOLDED PRODUCTS

FIELD OF THE INVENTION

The invention herein pertains to reinforced molded products and particularly pertains to molded rubber products with a balanced elongation reinforcement substrate incorporated therein.

DESCRIPTION OF THE PRIOR ART AND OBJECTIVES OF THE INVENTION

Molded products, particularly reinforced products molded out of rubber, have long been known to suffer from especially high scrap rates. Rubber products, for example brake diaphragms, routinely incorporate uncured portions of fabric during the formation process to assist in shape retention and overall structural stability. However, manufacturing testing clearly illustrates that indiscriminate fabric selection and incorporation results in defectively formed parts generally, and specifically "buckling" of the rubber product surface following compression molding, leading to scrap rates as high as 25% of a given manufacturing run. This level of scrap rate leads to increased material usage and is eventually passed on to the consumer in the form of higher costs.

Thus, in view of the problems and disadvantages associated with prior art devices and methods of manufacture, the present invention was conceived and one of its objectives is to provide a molded product with a reduced scrap rate relative to the prior art.

It is another objective of the present invention to provide a molded rubber product including a fabric reinforcement substrate to improve shape retention and overall structural stability of the product.

It is still another objective of the present invention to provide a molded product with a balanced elongation substrate reinforcement incorporated therein.

It is yet another objective of the present invention to provide a molded product with a balanced elongation substrate reinforcement and an adhesion promoter such as resorcinol-formaldehyde incorporated therein.

It is a further objective of the present invention to provide a method of forming a molded product with a balanced elongation substrate reinforcement by weaving a fabric member "without size" which renders the fabric more pliable and allows for easier compaction of yarn density to build crimp and elongation of the base fabric when overfeed finishing of fabric after weaving.

It is still a further objective of the present invention to provide a method of forming a molded product with a balanced elongation substrate reinforcement by overfeeding the fabric to balance the elongation thereof in all directions.

It is yet a further objective of the present invention to provide a method of forming a molded product with a balanced elongation substrate reinforcement by reducing the number of picks to increase elongation in the length direction to match elongation in the width direction, resulting from the compacting of picks back to increased density to build crimp.

Various other objectives and advantages of the present invention will become apparent to those skilled in the art as a more detailed description is set forth below.

SUMMARY OF THE INVENTION

The aforesaid and other objectives are realized by providing a rubber molded product such as a brake cylinder diaphragm with a balanced elongation substrate reinforcement incorporated therein. The substrate reinforcement, preferably a fabric member, is woven without size and then overfed during finishing, leading to balanced crimp and elongation in the length and width directions. The fabric member is also formed with a reduced number of weft threads or picks to further render the fabric elongation more isotropic in at least the length and width directions. This fabric is placed in the mold along with the molding material and formed into the desired shape to assist in shape retention and overall structural stability.

A method of forming a molded product such as a rubber brake cylinder diaphragm is also disclosed and includes the steps of providing a weaving material in the warp and weft directions, weaving the material without size to form a fabric defining a reduced number of picks than is customary, and overfeeding the fabric as it is finished to balance the crimp and elongation in both the length and width directions. The method also includes the steps of placing the resulting fabric in a mold and curing a rubber product about the balanced crimp substrate reinforcement to realize a substantially lower rate of product defects due to buckling and creasing than known in the prior art, greatly reducing the scrap rate of such products in the process.

DETAILED DESCRIPTION OF THE PREFERRED EMBODIMENT AND OPERATION OF THE INVENTION

Figure 1:
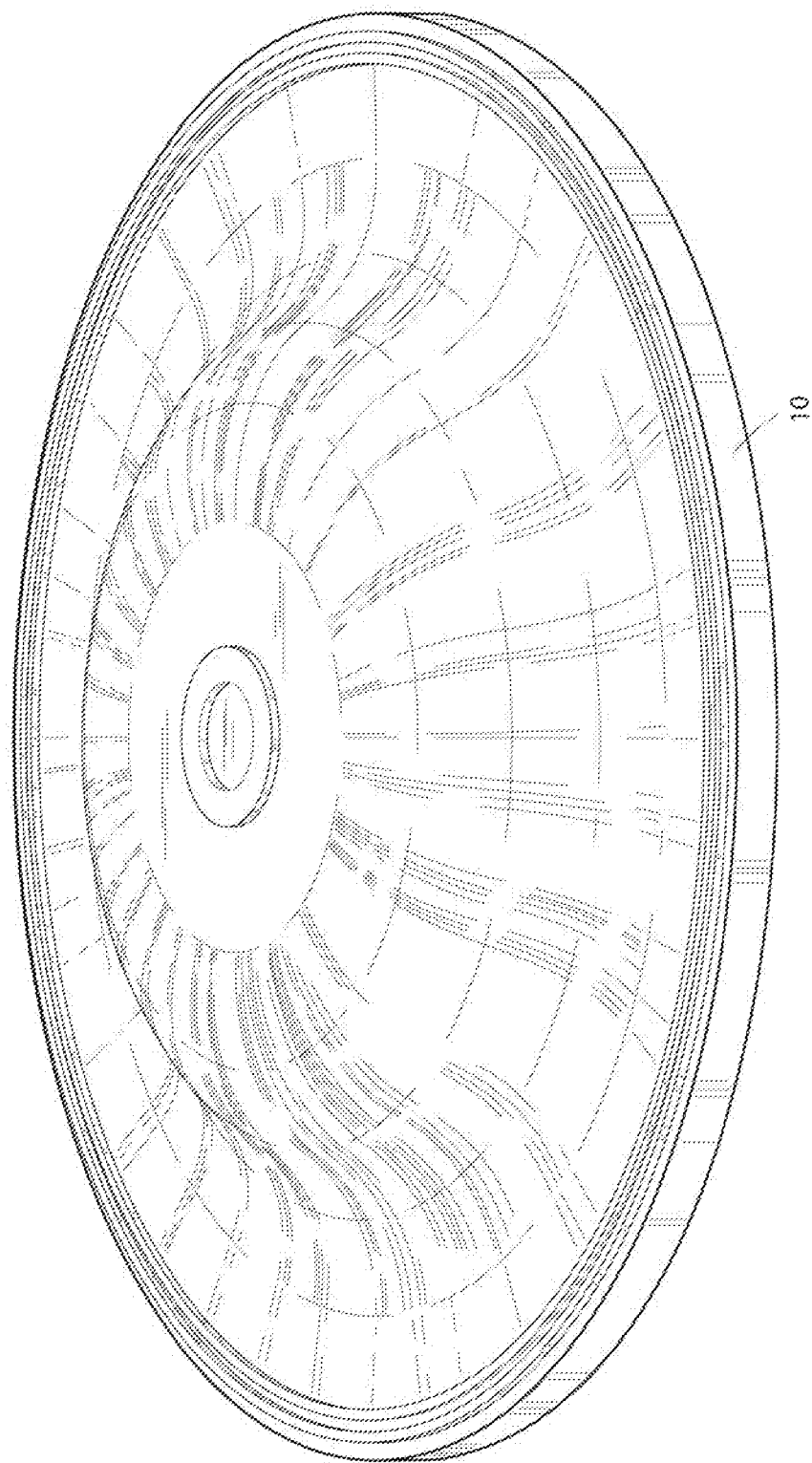
FIG. 1 shows an elevated perspective view of a molded member with a balanced crimp substrate reinforcement therein.
Figure 2:
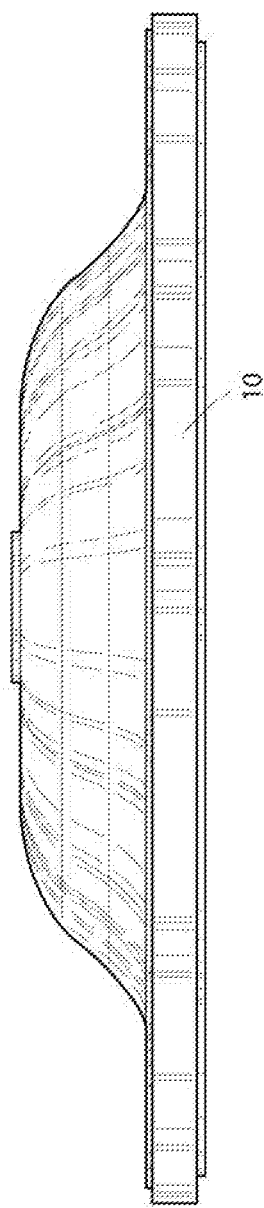
FIG. 2 pictures an elevated side view of the molded member of FIG. 1.
Figure 3:
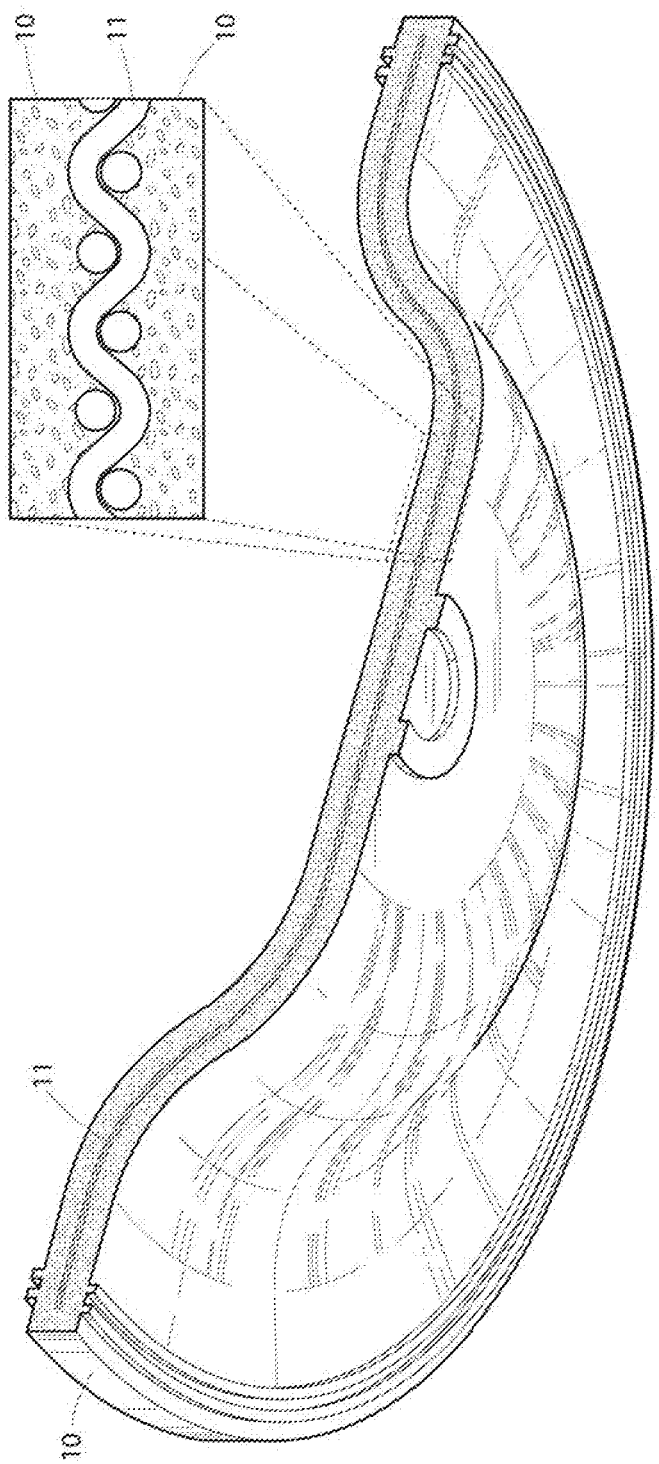
FIG. 3 depicts an elevated side cross-sectional view of the molded member of FIG. 2.

For a better understanding of the invention and its operation, turning now to the drawings, FIGS. 1-3 illustrate preferred molded product 10 including preferred substrate reinforcement 11. As depicted specifically in FIGS. 1 and 2, molded product 10 is represented as a rubber brake master cylinder diaphragm, but it is anticipated that substrate reinforcement 11 may improve the scrap rates of a wide variety of molded product, both rubber and non-rubber, and therefore it should be understood that the representations of molded product 10 are included herein for context, but should not be construed as a limitation.

As described previously, the non-specific inclusion of woven material within molded products is known in the art, so the general details such as length, width, and weave patterns of such materials will not be the focus of the instant disclosure. However, indiscriminate inclusion of woven members within molded products has been demonstrated to result is high scrap rates of molded products, with experimentally determined product failure rates as high as 25%. It was hypothesized that balancing the elongation properties of the woven member (i.e. approximately similar elongation in both the warp and fill directions, and preferably a difference of 100 kPa or less) would greatly reduce the creasing or buckling phenomenon observed in the production of molded products. Therefore, preferred substrate reinforcement 11 is a woven fabric member that defines a substantially similar elongation measurement in at least the length (i.e. warp) and width (i.e. fill) directions relative to the fabric.

To render warp threads more resistant to the mechanical stress of weaving and at the same time to stick projecting fibers or filaments to the yarn, yarns may be sized. The sizing of warps from the processing from natural staple fiber yarns has been known for many years (for example see Falkai et al., Synthesefasern, pp. 334-5, Verlag Chemie, 1981). The size is intended to bind together the filaments of the yarn for the weaving process but to leave the yarns readily separable from one another for shed formation. As-spun or zero twist yarns perform poorly in many of the common textile operations, such as winding, weaving, knitting, and the like, due primarily to a looseness of structure that permits individual filaments to snag and break, thence forming fluffballs, slubs, ringers, wraps, stripbacks, or similar defects. Moreover, zero-twist yarn runs in the form of a ribbon over guides, rollers, etc., and the attendant increase in friction often results in abraded yarn which is even more prone to mechanical failure. As a result of these shortcomings, the textile trade is extremely reluctant to use zero-twist yarn, and yarn producers or those processing the yarn must carry out the additional step of twisting each yarn to provide an acceptable starting product. Twisting serves to compact and unify a yarn bundle, resulting in a more cohesive structure which resists the pulling out of individual filaments. However, conventional true twisting is expensive and time consuming and, being a discontinuous operation, adds disproportionately to the cost of the yarn. Further, the mechanics of true twisting and the additional handling required often results in yarn of lower quality. As such, weaving "without size" is highly disfavored in the textile industry, which makes the superiority of the instant textile all the more surprising.

By weaving the yarns which make up preferred substrate reinforcement 11 without size, the resulting fabric defines a greater elongation characteristic in the warp direction as well as becoming more pliable than similarly woven fabrics. This however, is singularly insufficient to produce a balanced crimp reinforcement substrate. Preferably, a fabric with a lower number of weft yarns than is conventional may be used to generate a substrate that is looser than is generally desirable for a use such as retaining the rubber of molded product 10. Therefore, it is also preferable to weave a fabric with a reduced number of weft yarns per inch of woven fabric, a metric often referred to as "picks" or "picks per inch". The isolated result of a reduced pick count on a fabric generally produces a fabric that is too loose as described above, but the balanced elongation qualities are the result of such a selection, so the preferred manner in which the fabric is reinforced is through a production process known as "overfeeding". By increasing the fabric through the frame in the warp direction relative to the weft yarns woven in the fill direction during finishing, the resulting fabric develops a balanced crimp as well as substantially isotropic elongation measurements in at least the warp and fill (i.e. length and width) directions. This permits the ratio of warp yarns to fill yarns into the frame to increase (for example between 5-10%, about 10%, and about 9%), the warp elasticity is increased, balancing the elongation in the warp and fill directions, as well as other tangent directions.

By way of example, a prior woven textile formed from a standard polymeric material such as polyester in a conventional weave pattern commonly defines unbalanced elongation characteristics with respect to elongation in the warp and fill directions. Stated another way, the status of the art demonstrates woven fabrics with elongation that is significantly greater in the either the length or width directions, but not both. In testing, such a product defined a modulus of elongation (also known as Young's modulus or elastic modulus) in the warp direction of 1250 kilopascals (kPa) and a modulus of elongation in the fill direction of 800 kPa, with a difference between the warp and fill elongation values of 450 kPa. By comparison, preferred substrate reinforcement, when formed from the exact same material and in the exact same weave pattern, defines a modulus of elongation in both the warp and fill directions in a range between 950-1050 kPa, with a difference of 100 kPa, and preferably less than 100 kPa. These results are summarized in Chart 1 below:

CHART 1

|  | Elongation in the Warp Direction (kPa) | Elongation in the Fill Direction (kPa) | Elongation Difference between Warp and Fill Directions (kPa) |
| --- | --- | --- | --- |
| Conventional Fabric | 1250 | 800 | 450 |
| Substrate Reinforcement | 950-1050 | 950-1050 | 100 |

Figure 4:
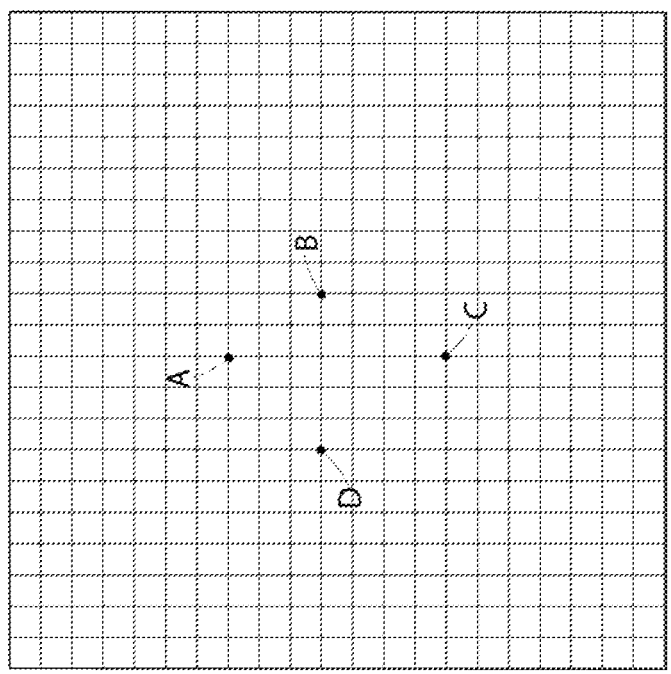
FIG. 4 demonstrates a schematic representation of the substrate reinforcement in a first, unstretched orientation.
Figure 5:
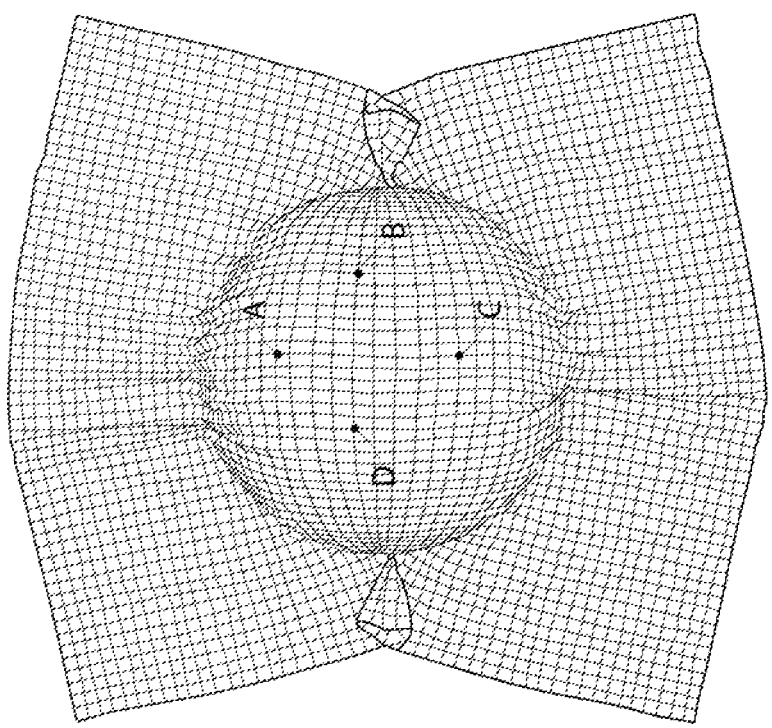
FIG. 5 illustrates a schematic representation of a conventional reinforcement fabric in a second orientation, demonstrating creases.
Figure 6:
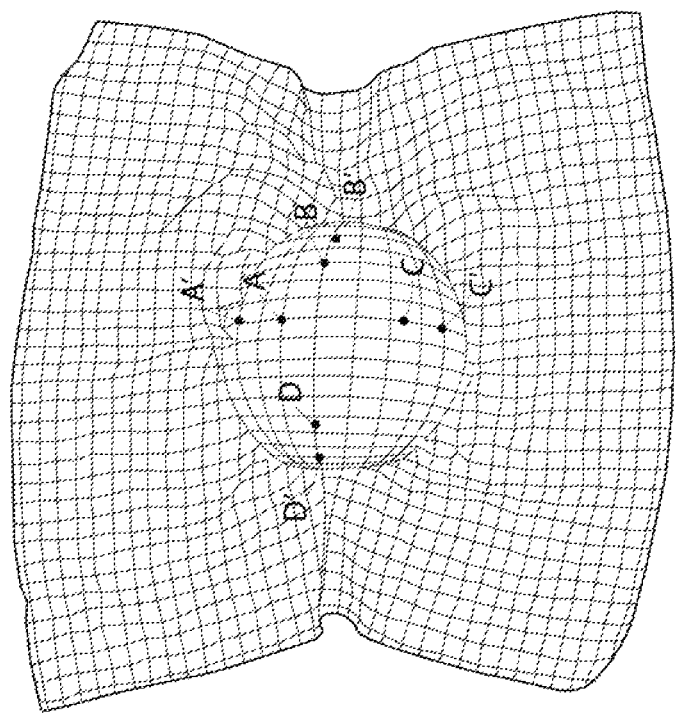
FIG. 6 shows a schematic representation of the substrate reinforcement of FIG. 4 in a second, more elongated orientation.

As demonstrated in FIGS. 3-5, preferred substrate reinforcement 11 is intended to be incorporated into a wide range of molded products, which in turn utilize the balanced elongation properties described above to retain the shape of a molded product during curing. It has been determined that the deeper the depth of an arcuate surface such as the "bowl" of the illustrated molded product 10 (i.e. a brake diaphragm), the greater the likelihood that a molded product will suffer increased product defects during the molding process (see FIG. 5 as an example), as the elongation properties are more enhanced the greater the need is for balanced elongation. This buckling or creasing of the molded product is a direct result of the indiscriminate fabric to properly elongate like that of substrate reinforcement 11. FIG. 4 demonstrates a schematic representation of substrate reinforcement 11 in a first, unstretched (i.e. substantially planar) orientation as indicated by the measurement marks A, B, C, and D. FIG. 6 also illustrates a schematic representation of substrate reinforcement 11 in a second, more elongated orientation relative to FIG. 4. While pictures free of molded product 10, it should be understood that during the formation and curing of molded product 10, substrate reinforcement 11 elongates along one, two, or more different vectors as indicated by the measurement points in FIG. 6 relative to FIG. 4, and this ability to elongate in any direction is the reason no buckling or creasing occurs as described above. Specifically, measurement marks A, B, C, and D have all displaced in lateral, longitudinal, and/or angular (i.e. extending between longitudinal and lateral axes) vectors as indicated in FIG. 6 relative to their respective position in FIG. 4, indicating schematically the elongation of substrate reinforcement 11 as evidenced by the positioning of A', B', C', and D', respectively. By comparison, FIG. 5 presents a schematic representation of a woven fabric with indiscriminate (i.e. unbalance) elongation characteristics, of the type typically associated with molded products. As should be readily apparent, measurement marks A, B, C, and D have not displaced significantly relative to their respective position in FIG. 4, leading to increased creasing, particularly at the "X" axes of the envisioned molded product (not shown). In an alternate example (not shown), the measurement marks associated with a single direction of elongation may displace (for example, marks B and D) but due to the unbalanced elongation characteristics of the prior art, the other marks may not. As would be understood, the balanced elongation properties of substrate reinforcement 11 in both the warp and fill directions does not necessarily mandate that substrate reinforcement 11 elongate equally in lateral, longitudinal, and/or angular directions, even though it is capable of doing so.

A method of forming a molded product 10 including balanced crimp substrate reinforcement 11 is also disclosed and includes the steps of predetermining a material out of which to form the fabric, in certain embodiments such a material may be polyester, nylon, or the like, and embodiments for further include an adhesion promoter like resorcinol-formaldehyde (RFL). The material is formed into a web, preferably by a weaving process, more preferably woven without size, and more preferably still utilizing an overfeed process after weaving, producing a fabric with a reduced starting pick count compared to conventionally woven fabrics but matching conventional fabric with respect to final pick count due to the overfeeding process, which results in higher crimp and balanced elongation. The result is a fabric that is more pliable than the prior art embodiments and defines generally isotropic elongation characteristics in at least the warp and fill directions, and preferably in all directions, in one embodiment defining a modulus of elongation in both the warp and fill directions of within 100 kPa, and more preferably less than 100 kPa. In a preferred embodiment, substrate reinforcement 11 is formed into a generally circular shape, although other shapes may be more desirable depending on the needs of a specific molded product, and shape should not be considered a limitation of the instant innovation. Preferred substrate reinforcement 11 is then placed into a mold of the type generally known in the art and the material intended to form molded product 10 is introduced, for example rubber as is the case in the formation of a brake diaphragm. Substrate reinforcement 11 serves to assist in the shape retention and improve the overall structural stability of molded product 10 without falling victim to creasing or buckling during curing, phenomena which has led to scrap rates as high as 20-25% in the prior art.

The illustrations and examples provided herein are for explanatory purposes and are not intended to limit the scope of the appended claims.

We claim:

1. A rubber molded brake diaphragm defining a bowl shaped portion, and consisting of a substrate reinforcement configured to improve shape retention and overall structural stability of the brake diaphragm by defining a fabric, circular in shape and of sufficient size to match a size of the bowl, with isotropic elongation in both a warp and weft directions, and a resorcinol-formaldehyde adhesion promoter, wherein the isotropic elongation is the result of weaving without size, reducing a number of weft yarns relative to a number of warp yarns woven, and overfeeding to increase a ratio of the warp yarns relative to the weft yarns by 5-10% in a manufacturing process of the substrate reinforcement, wherein a modulus of elongation for the warp and fill directions is defined as between 950-1050 kPa, and wherein the incorporation of the substrate reinforcement defining the aforementioned isotropic elongation results in a rubber brake diaphragm with a manufacturing scrap rate of less than 20%.

2. The brake diaphragm of claim 1, wherein the ratio of the warp yarns relative to the weft yarns overfed in a manufacturing process of the substrate reinforcement is 9%.

3. A combination of a rubber molded brake diaphragm and a fabric substrate reinforcement, the combination consisting of,
a rubber molded brake diaphragm defining a bowl-shaped portion; and
a substrate reinforcement configured to improve shape retention and overall structural stability of the brake diaphragm by defining a fabric, circular in shape and of sufficient size to match a size of the bowl, with isotropic elongation in both a warp and weft directions, and a resorcinol-formaldehyde adhesion promoter;
wherein the isotropic elongation is the result of weaving without size, reducing a number of weft yarns relative to a number of warp yarns woven, and overfeeding to increase a ratio of the warp yarns relative to the weft yarns by 9% in a manufacturing process of the substrate reinforcement, wherein a modulus of elongation for the warp and fill directions is defined as between 950-1050 kPa, and wherein the incorporation of the substrate reinforcement defining the aforementioned isotropic elongation results in a rubber brake diaphragm with a manufacturing scrap rate of less than 20%.

4. A rubber molded brake diaphragm defining a bowl shaped portion, and comprising a substrate reinforcement configured to improve shape retention and overall structural stability of the brake diaphragm by defining a fabric, circular in shape and of sufficient size to match a size of the bowl, with isotropic elongation in both a warp and weft directions, and a resorcinol-formaldehyde adhesion promoter, wherein the isotropic elongation is the result of weaving without size, reducing a number of weft yarns relative to a number of warp yarns woven, and overfeeding to increase a ratio of the warp yarns relative to the weft yarns by 5-10% in a manufacturing process of the substrate reinforcement, wherein a modulus of elongation for the warp and fill directions is defined as between 950-1050 kPa, and wherein the incorporation of the substrate reinforcement defining the aforementioned isotropic elongation results in a rubber brake diaphragm with a manufacturing scrap rate of less than 20%.

5. The brake diaphragm of claim 4, wherein the ratio of the warp yarns relative to the weft yarns overfed in a manufacturing process of the substrate reinforcement is 9%.

* * * * *